(12) United States Patent
Teggatz et al.

(10) Patent No.: US 7,133,268 B2
(45) Date of Patent: Nov. 7, 2006

(54) CURRENT CONTROL VIA A VARIABLE VOLTAGE SNUBBING NETWORK

(75) Inventors: Rex M. Teggatz, Sachse, TX (US); Wayne Tien-Feng Chen, Plano, TX (US); Joseph Devore, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 231 days.

(21) Appl. No.: 10/725,164

(22) Filed: Dec. 1, 2003

(65) Prior Publication Data

US 2005/0117265 A1 Jun. 2, 2005

(51) Int. Cl.
*H02H 3/20* (2006.01)
*H02H 9/04* (2006.01)

(52) U.S. Cl. .................................. 361/91.1; 361/91.7

(58) Field of Classification Search ............... 361/91.1, 361/91.7
See application file for complete search history.

(56) References Cited

U.S. PATENT DOCUMENTS

| | | | | |
|---|---|---|---|---|
| 5,834,826 A | * | 11/1998 | Menegoli | 257/546 |
| 5,969,964 A | * | 10/1999 | Mangtani | 363/132 |
| 5,973,943 A | * | 10/1999 | Ribarich et al. | 363/56.05 |
| 6,772,737 B1 | * | 8/2004 | Gaessler et al. | 123/490 |
| 6,853,232 B1 | * | 2/2005 | Sander et al. | 327/312 |
| 2002/0074194 A1 | * | 6/2002 | Kimble | 188/166 |
| 2004/0095183 A1 | * | 5/2004 | Swize | 327/423 |

\* cited by examiner

*Primary Examiner*—Stephen W. Jackson
*Assistant Examiner*—Dharti H. Patel
(74) *Attorney, Agent, or Firm*—William B Kempler; W. James Brady; Frederick J. Telecky, Jr.

(57) ABSTRACT

System and method for controlling current across a load. A preferred embodiment comprises a current varying circuit (such as current varying circuit 525) that can create a sequence of voltage drops in a driver circuit (such as the driver circuit 505) coupled to an inductive load (such as the inductive load 535). By initially producing a large voltage drop and then stepping the voltage drop down gradually, the current in the inductive load can be rapidly removed without producing a current undershoot, which, in certain applications, can result in unwanted noise and vibration.

34 Claims, 6 Drawing Sheets

CURRENT CONTROL VIA A VARIABLE VOLTAGE SNUBBING NETWORK

TECHNICAL FIELD

The present invention relates generally to a system and method for analog circuits, and more particularly to a system and method for controlling current across a load by changing a voltage across a snubbing network.

BACKGROUND

The amount of current flowing through an inductive load (such as a valve or solenoid, for example) can be used to control the operation of many devices. For example, the amount of current flowing through an automotive brake solenoid can determine the amount of braking pressure being applied. There are times when the current through the inductive load needs to change quickly from one current level to another current level. Referring back to the automotive brake solenoid example, there may be a need to rapidly apply a significant amount of braking pressure and then release the braking pressure. This may be needed for applications such as anti-lock braking, vehicle traction control, anti-skid control, and so forth.

One way to accomplish the rapid change in the inductive load current is to use a closed control loop to allow a voltage across the inductive load to fly-back and snub. This allows for a rapid change in the current across the inductive load.

A disadvantage of the prior art is that the rapidly changing voltage can result in a very fast current transition through the load. This change (dI/dT) may be too fast for the control loop to respond to and may result in a current undershoot in the system. In the automotive brake solenoid example, current undershoot can result in a shuttering of the brakes, which provide an unpleasant sensation (and noise) for the operator of the automobile.

SUMMARY OF THE INVENTION

These and other problems are generally solved or circumvented, and technical advantages are generally achieved, by preferred embodiments of the present invention which provides for a system and method for controlling current across an inductive load to prevent current undershoot.

In accordance with a preferred embodiment of the present invention, a method for controlling a clamping voltage across a terminal of a transistor comprising providing a first clamping voltage in a conductive loop that includes the terminal of the transistor for a first specified period of time, reducing the first clamping voltage to an intermediate clamping voltage, holding the intermediate clamping voltage for a specified period of time, and repeating the reducing and the holding until the intermediate clamping voltage is essentially equal to a final clamping voltage is provided.

In accordance with another preferred embodiment of the present invention, a method for rapidly removing a current from an inductive load without current undershoot comprising setting a variable current source to produce a first current, holding the variable current source output for a first period of time, checking if a terminating condition is met, setting the variable current source to produce a second current for a second period of time, wherein the second current is smaller than the first current, if the terminating condition is not met, and repeating the checking and the setting is provided.

In accordance with another preferred embodiment of the present invention, a circuit comprising a driver circuit coupled to an inductive load, the driver circuit containing circuitry to control a current built up across the inductive load and a voltage varying circuit coupled to the driver circuit, the voltage varying circuit containing circuitry to produce a sequence of voltages is provided.

An advantage of a preferred embodiment of the present invention is that current undershoot through an inductive load can be eliminated. Eliminating current undershoot can prevent the occurrence of unpleasant sensations and sounds in certain applications.

A further advantage of a preferred embodiment of the present invention is that the rate of change in the current can be varied to either speed-up or slow down the rate of change in the current flow through an inductive load.

Yet another advantage of a preferred embodiment of the present invention is that the preferred embodiment of the present invention requires a relatively simple implementation that can be integrated, therefore increasing the overall reliability of the system while reducing costs.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a circuit with an inductive load which may need rapid changes in current flow across the inductive load. The invention may also be applied, however, to other applications, where rapid current changes across a load may be needed but the current change may be too fast and a current undershoot situation arises. Examples of such applications may include automotive brake applications, DC motor control, read/write heads for hard drives, and so on.

Figure 1:
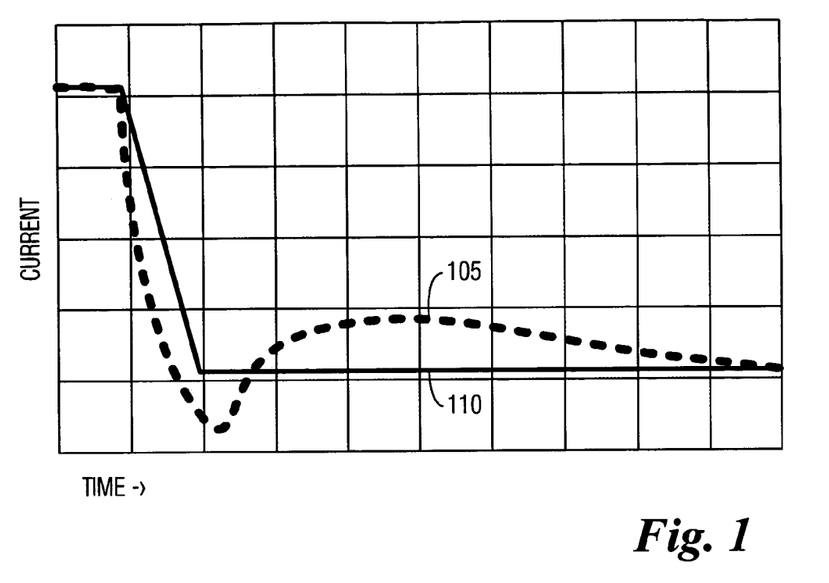
FIG. 1 is a diagram of a current undershoot resulting from a rapid current change.

With reference now to FIG. 1, there is shown a data plot illustrating a current undershoot situation resulting from a rapid current change. A first curve 105 illustrates an exemplary current across an inductive load while a second curve 110 illustrates an ideal current. The second curve 110 illustrates an ideal current transition from a first current level to a second current level, with the current transition being quick and with no current undershoot and no compensation resulting from the undershoot. The first curve 105, on the other hand, illustrates what may happen with a current across an inductive load if the transition from the first current level to the second current level is too rapid. Due to rapidness of the change in the current, the current across the inductive load can fall below the second current level and then rises back to the second current level. Then, the current level may rise to a level that is higher than the second current level and falls back down to the second current level. In may applications, the current undershoot and the compensation may lead to unpleasant and unwanted noise and/or vibrations.

Figure 2:
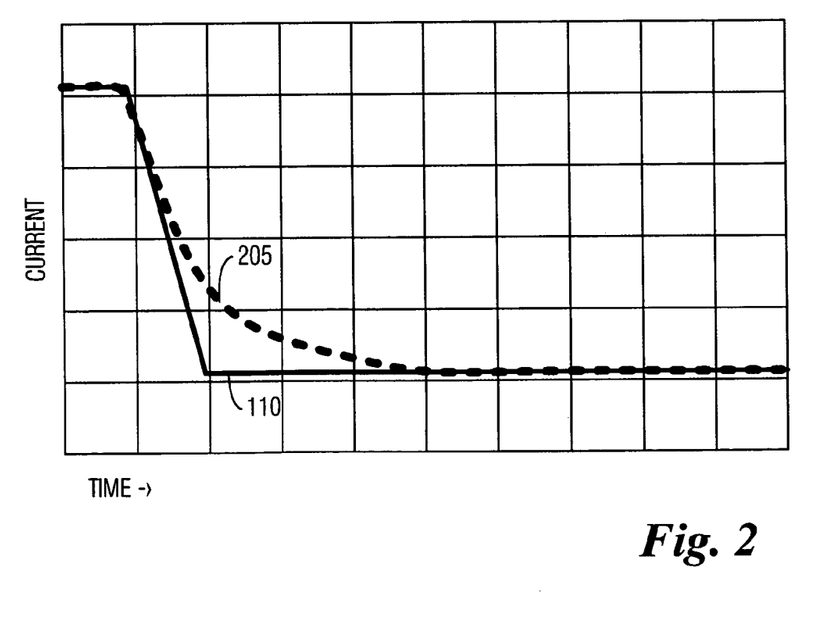
FIG. 2 is a diagram of an ideal current change across an inductive load.

With reference now to FIG. 2, there is shown a data plot illustrating an ideal current change across an inductive load. A first curve 205 illustrates an ideal current across an inductive load, wherein the current change is such that an undershoot situation does not arise. Again, the second curve 110 illustrates an ideal current transition. The undershoot situation may be prevented by reducing the amount of current change across the inductive load. Note that while the amount of time required for the current across the inductive load to change from a first current level to a second current level may be longer than in the situation displayed in FIG. 1, the current (shown as the first curve 205) across the inductive load reaches a steady state sooner. This can be due to the lack of the current undershoot situation and then the needed compensation. Furthermore, since there is no undershoot (and compensation), there may not be any unpleasant noise and/or vibrations.

To achieve the change in current across an inductive load, a commonly used technique changes the voltage dropped across the inductive load. The change in the voltage results in a change in the current. As discussed above, a sudden and large change in the voltage across the inductive load may lead to a current undershoot situation.

Figure 3:
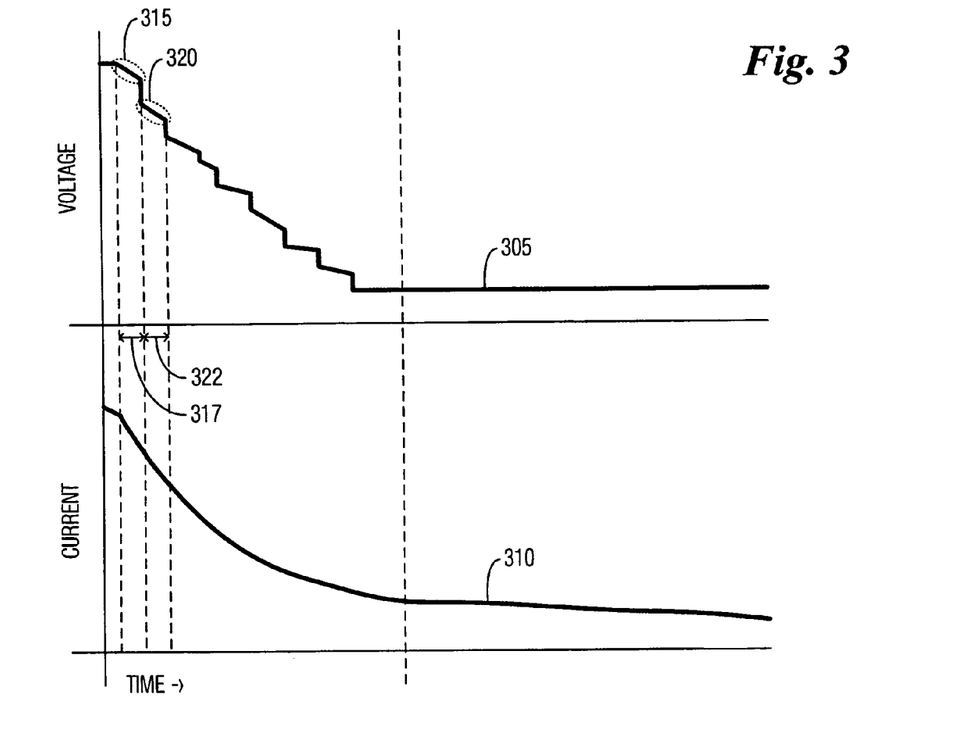
FIG. 3 is a diagram of the effects of small changes in voltage across an inductive load on the current across the inductive load, according to a preferred embodiment of the present invention.

With reference now to FIG. 3, there is shown a data plot illustrating the effects of making small changes in the voltage across an inductive load and the resulting change in current across the inductive load, according to a preferred embodiment of the present invention. The data plot illustrates two curves with respect to time. A first curve 305 illustrates voltage across an inductive load and a second curve 310 illustrates current across the same inductive load. Previously, when it was desired to change the current across an inductive load, one can simply switch the voltage applied over the inductive load. Unfortunately, more often than not, the resulting switch in the current was too fast and a current undershoot can occur.

According to a preferred embodiment of the present invention, rather than suddenly switching the voltage across the inductive load from a first voltage to a second voltage, the change between the first and second voltages could be achieved in increments (or steps) over a period of time. The net result could be that the voltage across the inductive load may still change from the first voltage to the second voltage and that the current across the inductive load could change from a first current to a second current, but that since the change can be achieved in steps (instead of at one time), then a situation wherein the current undershoots the second current can be prevented.

As displayed in the first curve 305, the voltage across an inductive load may be permitted to drop (such as voltage drops 315 and 320) slowly within intervals (such as a first interval 317 and a second interval 322), but in between the intervals, the voltage may be permitted to change rapidly. Alternatively, within an interval, the voltage may be held constant and change only between intervals. Note that the intervals can vary in duration or they may remain constant. Additionally, the behavior of the voltage can vary within each interval. For example, in one interval, the voltage may be held constant and in another interval, the voltage may be changed slowly. Furthermore, within intervals, the amount of change in the voltage levels can vary. The point of changing the voltage across the inductive load in a number of small steps rather than in one large step is that by changing the voltage in small steps, a current undershoot may not develop. This can permit a smooth change in the current across the inductive load.

Figure 4A:
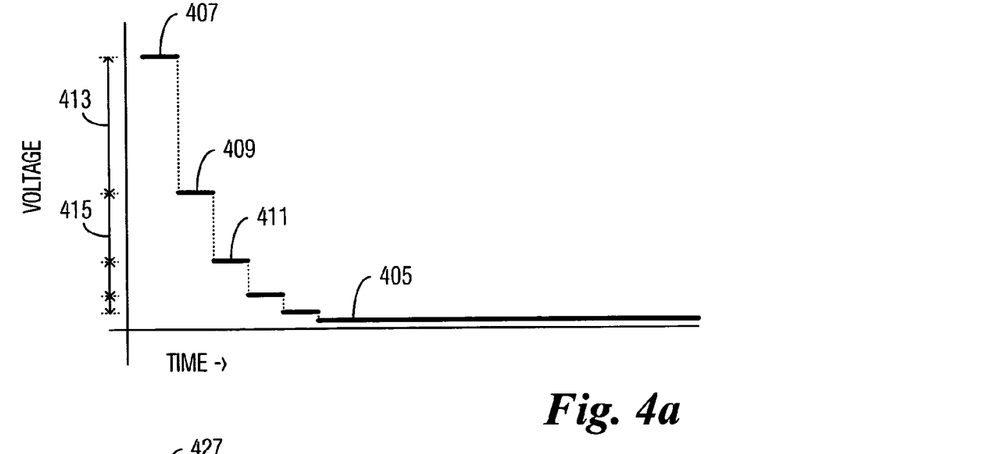
FIGS. 4a through 4c are diagrams of different schemes for stepping down a voltage across an inductive load, according to a preferred embodiment of the present invention.
Figure 4B:
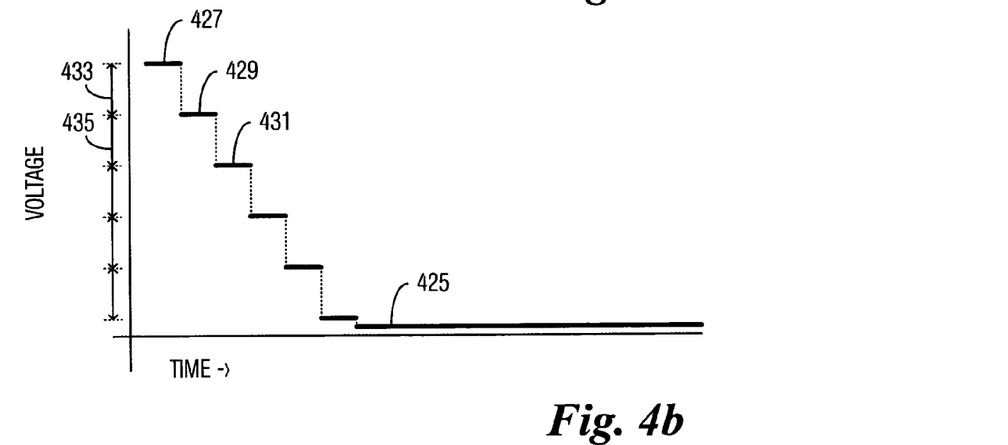
Figure 4C:
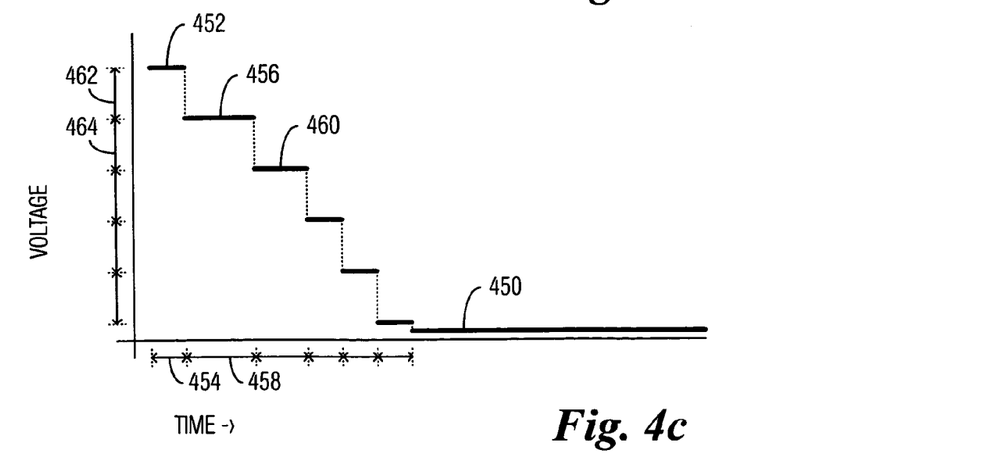

With reference now to FIGS. 4a through 4c, there are shown data plots illustrating various schemes for stepping down a voltage across an inductive load to ensure a fast change in the current across the inductive load while preventing a current undershoot situation, according to a preferred embodiment of the present invention. The data plots illustrated in FIGS. 4a through 4c display the voltage across the inductive load versus time. In each data plot, the voltage begins at an initial voltage level and finishes at a final voltage level after going through a number of intermediate steps where the voltage level changes. According to a preferred embodiment of the present invention, the voltage levels can vary as well as the time duration spent at each voltage level.

In FIG. 4a, a data plot illustrates a scheme for changing the voltage across the inductive load in a non-linear fashion, with the plot of the voltage versus time displayed as a curve 405. As illustrated in FIG. 4a, after holding an initial voltage level 407 for a certain interval of time, the voltage across the inductive load may be decreased to a second voltage level 409, which can then be followed by another decrease to a third voltage level 411. Note that a voltage difference from the initial voltage level 407 to the second voltage level 409 (displayed as highlight 413) may be significantly larger than a voltage difference from the second voltage level 409 to the third voltage level 411 (displayed as highlight 415). Additionally, the voltage difference may continue to decrease as the voltage across the inductive load approaches the final voltage level. One particular implementation of the voltage varying scheme may be referred to as a binary scheme, wherein a voltage difference in one voltage level change may be one-half (½) the voltage different of the preceding voltage level change. Other ratios, such as one-third (⅓), one-fourth (¼), one-fifth (⅕), and so on may also be equally functional, as well as continually changing ratios wherein the ratio between adjacent voltage level changes can differ.

In FIG. 4b, a data plot illustrates a scheme for changing the voltage across the inductive load in a linear fashion, with the plot of the voltage versus time displayed as a curve 425. As illustrated in FIG. 4b, after holding an initial voltage level 427 for a certain interval of time, the voltage across the inductive load may be decreased to a second voltage level 429, which can then be followed by another decrease to a third voltage level 431. Note that a voltage difference from the initial voltage level 427 to the second voltage level 429 (displayed as highlight 433) may be approximately the same as a voltage difference from the second voltage level 429 to the third voltage level 431 (displayed as highlight 435).

In FIG. 4c, a data plot illustrates a scheme for changing the voltage across the inductive load, wherein the amount of time at each voltage level may vary, with the plot of the voltage versus time displayed as a curve 450. As illustrated in FIG. 4c, an initial voltage level 452 may be maintained for an initial period of time (displayed as highlight 454). The voltage level across the inductive load may then be decreased to a second voltage level 456 and held for a second period of time (displayed as highlight 458). The voltage level may be lowered to a third voltage level 460 and held for another period of time and then continued to be lowered until it reaches a final voltage level. Note that the first period of time (highlight 454) may be of a different duration than the second period of time (highlight 458) and other periods of time. As illustrated in FIG. 4c, the drops between voltage levels (for example, highlights 462 and 464) can be essentially equal.

Some of the schemes illustrated in FIGS. 4a through 4c may be combined. For example, a scheme with a variable voltage drop (as shown in FIG. 4a) can be combined with a variable voltage hold time (as shown in FIG. 4c) or a scheme with a fixed voltage drop (as shown in FIG. 4b) can be combined with a variable voltage hold time (as shown in FIG. 4c). A scheme using a variable voltage drop may have an advantage in that the initial voltage level drops may be configured so that they are larger than the voltage level drops occurring as the voltage level approaches the final voltage level. By doing so, a more rapid change in the current across the inductive load may be realized while the small voltage changes near the end may prevent the current undershoot. However, a scheme using a fixed voltage drop may have an advantage in terms of implementation, wherein it may be simpler to design a circuit that changes the voltage levels by a fixed amount. Yet, a scheme using a variable hold time may be able to decrease the likelihood of a current undershoot occurring by adjusting the hold time depending upon the magnitude of the change in the voltage level across the inductive load.

Figure 5A:
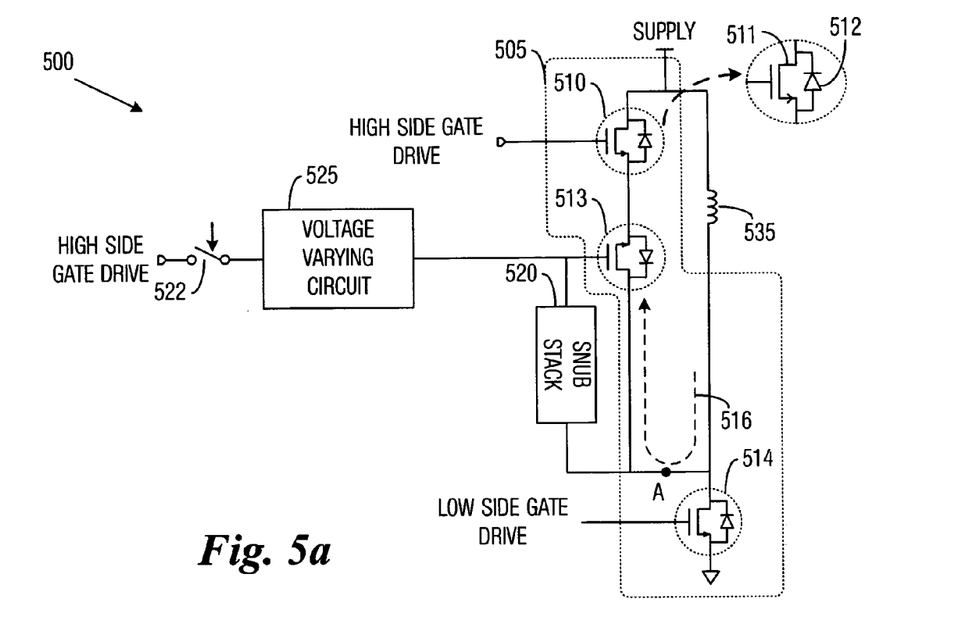
FIGS. 5a and 5b are diagrams of a circuit for controlling current across an inductive load and a process for controlling current across an inductive load, according to a preferred embodiment of the present invention.

With reference now to FIG. 5a, there is shown a diagram illustrating a high level view of a circuit 500 for controlling a current across an inductive load, according to a preferred embodiment of the present invention. The circuit 500, as displayed in FIG. 5a, can be partitioned into three distinct parts: a driver circuit 505, a snub stack 520, and a voltage varying circuit 525. These three distinct parts may be coupled to an inductive load 535 and may be used to control the current across the inductive load 535.

The driver circuit 505 can be a fairly standard high-side driver circuit with a corresponding low-side drive. Alternatively, the driver circuit 505 may be a low-side driver circuit, a half bridge or a full H-bridge circuit. The driver circuit 505 may be made from three drivers, such as a first high-side driver 510, a second high-side driver 513, and a low-side driver 514. The drivers may be identically designed to simplify the overall design of the driver circuit 505, although optimization may make the drivers different from one another. Taking a closer look at the first high-side driver 510, the first high-side driver 510 can be made from a MOSFET (metal-oxide semiconductor field-effect transistor) 511 with a diode 512 (a body diode) coupled from the drain terminal of the MOSFET to the source terminal of the MOSFET. The first high-side driver 510 may be coupled to a power supply (labeled "SUPPLY"), which can be a battery, for example. According to a preferred embodiment of the present invention, the MOSFET 511 may be made from an N-type material and can be referred to as an N-type MOSFET.

Depending upon the value of a voltage applied at the gate terminal of the MOSFET 511, the MOSFET 511 may be conductive or non-conductive. As such, the MOSFET 511 may be operating as a switch. The body diode 512 coupling the drain terminal of the MOSFET to the source terminal of the MOSFET can permit current flow from drain to source, but not vice versa. Therefore, even if the MOSFET 511 may not be conductive, current may flow across the first high-side driver 510 (through the body diode 512) as long as the current is of the proper polarity.

The low-side driver 514 may be the main driver for controlling current across the inductive load 535 and can be used to permit current to be built up across the inductive load 535 or permit current to be taken out from the inductive load 535. When current is to be built up across the inductive load 535, the low-side driver 514 may be closed (conducting) so that a current path can exist from the SUPPLY to electrical ground through the inductive load 535 and then the low-side driver 514. While the low-side driver 514 is closed, the first high-side driver 510 and the second high-side driver 513 should be open (nonconducting) to prevent a situation where current shoot through may arise. Since the first high-side driver 510 and the second high-side driver 513 may be closed, a second current path may be created to electrical ground through the first and second high-side drivers 510 and 513.

When taking current out from the inductive load 535 (commonly referred to as normal recirculation mode), the low-side driver 514 may be open (nonconducting) so that the current path between the SUPPLY and electrical ground can be severed. When operating in this mode, the second high-side driver 513 should be closed (conducting) while the first high-side driver 510 may be open. When the second high-side driver 513 is closed, a current path exists from the inductive load 535 through the second high-side driver 513 and through the body diode 512. The current path is shown in FIG. 5a as a dashed arrow 516. The current in the inductive load 535 can then move from the inductive load 535 through the second high-side driver 513 and then through the first high-side driver 510 and to the SUPPLY.

When the first high-side driver 510 is closed (the MOSFET 511 is closed), the circuit 500 may operate in a third mode referred to as a fast switch down mode. In the fast switch down mode, the current across the inductive load 535 is removed as rapidly as possible. Prior to the present invention, if the current across the inductive load 535 is removed too rapidly, a current undershoot situation may arise (FIG. 1 graphically displays a current undershoot).

When taking current out from the inductive load 535, the voltage at node "A" can be defined as the sum of the VDS (drain-source voltage) of the MOSFET 511 plus the VGS (gate-source voltage) of a MOSFET in the second high-side driver 513 plus the voltage drop across the snub stack 520. In an automotive application, the SUPPLY voltage may typically be a 12 volt car battery. Therefore, the voltage at the node "A" can be approximately 35 volts. Then, as the current across the inductive load 535 is removed, the voltage at node "A" continues to drop until it drops to a level that can be approximately equal to the SUPPLY voltage, which for an automotive application, may be 12 volts.

Since the VDS of the MOSFET 511 and the VGS of the MOSFET in the second high-side driver 513 may not be readily changed, varying the voltage contribution of the snub stack 520 to the voltage at node "A" may be a way to reduce (or eliminate) the current undershoot situation. The snub stack 520 can be fairly typical in design, built from a series combination of diodes, wherein the number of diodes may be dependent upon the voltage drop desired.

To provide a way to vary the voltage contribution of the snub stack 520, the voltage varying circuit 525, which can be coupled in parallel with the snub stack 520, can be used to provide a variable voltage drop in place of the snub stack 520. The voltage varying circuit 525 may be coupled to a high-side gate drive via a switch 522. With the voltage varying circuit 525 in operation, the voltage seen at node "A" can vary from simply being the sum of the VDS of the MOSFET 511 and the VGS of the MOSFET in the second high-side driver 513 all the way to the sum of the VDS of the MOSFET 511 and the VGS of the MOSFET in the second high-side driver 513 plus the maximum voltage produced by the voltage varying circuit 525. According to a preferred embodiment of the present invention, by gradually changing the voltage at node "A" between a first and a second value rather than instantaneously changing it from the first to the second value, current undershoot can be eliminated (or reduced). FIG. 3 displays how changing the voltage gradually can prevent current undershoot.

Note that with the substitution of the voltage varying circuit 525 for the snub stack 520, the snub stack 520 may no longer be used for its original intended purpose of providing a sufficient voltage drop to allow for a rapid discharge of current built up across the inductive load 535. However, the snub stack 520 can still be used to provide ESD (electrostatic discharge) protection for the circuit 500. Alternatively, with the presence of both the voltage varying circuit 525 and the snub stack 520, there may be an option of using either the voltage varying circuit 525 or the snub stack 520 to help facilitate the rapid discharge of the current built up across the inductive load 535. For example, by creating a circuit 500 with both the voltage varying circuit 525 and the snub stack 520, it can be simpler for the manufacturer by reducing the need to catalog and support two different circuits. Then, depending upon which option a user desires, one or the other (either the voltage varying circuit 525 or the snub stack 520) functionality can be enabled.

Figure 5B:
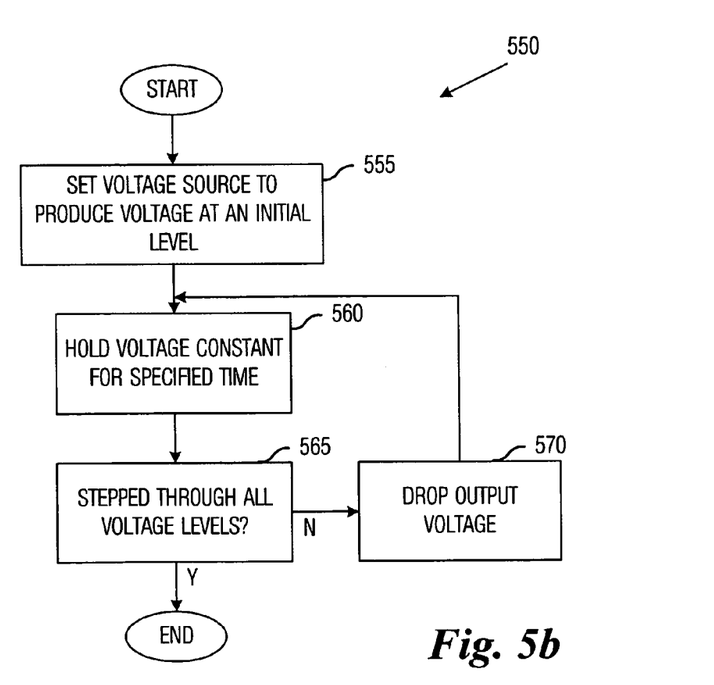

With reference now to FIG. 5b, there is shown a flow diagram illustrating a process 550 for controlling a current across an inductive load, according to a preferred embodiment of the present invention. The process 550 can be used to control the operation of the voltage varying circuit 525 (FIG. 5a). The process 550 may begin by configuring the voltage varying circuit 525 to produce an initial voltage (block 555). The voltage varying circuit 525 may be required to hold the voltage for a specified period of time (block 560). After the voltage has been held constant for the specified period of time, then the process 550 may check to see if the voltage varying circuit 525 has produced all of the desired voltage levels (block 565). If it has, then the process 550 may terminate. If it has not, then the process 550 may configure the voltage varying circuit 525 to produce another voltage (block 570), which it may be required to maintain for a specified period of time. Note that the time that the voltage varying circuit 525 is required to hold each voltage can be different (or the same) for each voltage. Additionally, the different voltages can differ from one another in equal amounts or in differing amounts.

Figure 6:
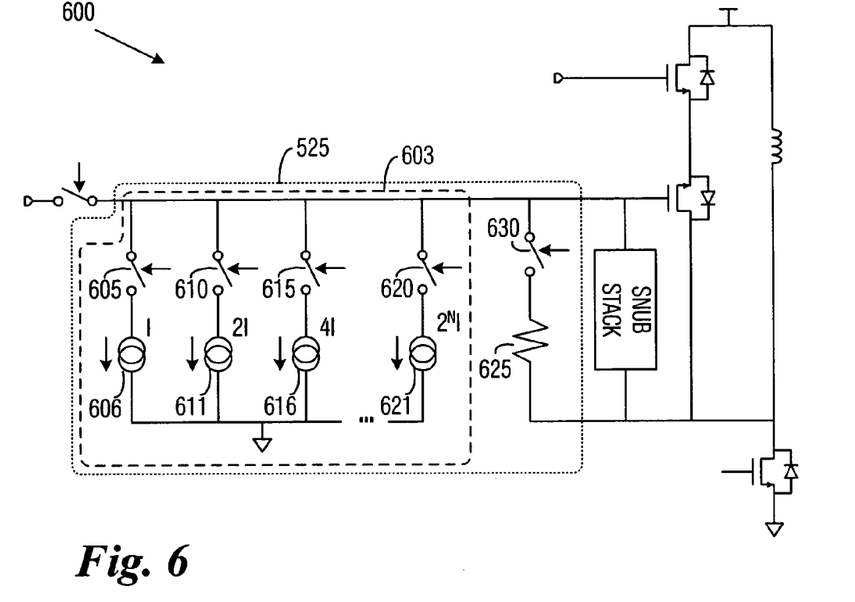
FIG. 6 is a diagram of a circuit for controlling current across an inductive load with a detailed view of the voltage varying circuit, according to a preferred embodiment of the present invention.

With reference now to FIG. 6, there is shown a diagram illustrating a circuit 600 for controlling current across an inductive load with a detailed view of the voltage varying circuit 525, according to a preferred embodiment of the present invention. According to a preferred embodiment of the present invention, the voltage varying circuit 525 may include a variable current source 603, a resistor (RSNUB) 625, and a switch 630. According to a preferred embodiment of the present invention, the variable current source 603 may be designed as a series of N+1 current sources 606, 611, 616, and 621, wherein N is a positive integer number. Each current source may be designed to produce essentially the same current or different current. As illustrated in FIG. 6, the current sources 606, 611, 616, and 621 may be designed to produce current in an increasing power of two (2) manner. For example, a current produced by the current source 606 may be defined as I, while a current produced by the current source 611 may be 2*I and a current produced by the current source 616 may be 4*I. In general, a current produced by an Nth current source, wherein the current sources are designed to produce current in a power of two manner can be expressed as $2^{N-1}*I$. Note that the power of two arrangement for the current sources is only one of many possible arrangements and should not be thought of as limiting the spirit of the present invention.

Coupled to each current source (for example, the current source 606) can be a switch (for example, the switch 605) that may be used to complete a current path between the current source 606 and the RSNUB resistor 625 and the switch 630. The current produced by the current sources that may have their respective switches closed can be additively combined can be the current produced by the variable current source 603 and when the switch 630 is closed, a voltage that is proportional to the combined current times the value of the RSNUB resistor 625 may be seen across the RSNUB resistor 625.

The switches coupled to the current sources, such as switches 605, 610, 615, and 620 may be controlled in such a way as to control the current produced by the variable current source 603. As described above, the current produced by the variable current source 603 can be the sum of the currents produced by the current sources which have their respective switches closed. In order to produce the stepped decrease in the current across the RSNUB resistor 625, the switches in the variable current source 603 may be opened and closed in a desired order. For example, if the desired sequence for the variable current source 603 output current is 15*I, 12*I, 8*I, 4*I, 2*I, and I and if the variable current source has four current sources 606, 611, 616, and 621 that are coupled to switches 605, 610, 615, and 620 and are capable of producing I, 2*I, 4*I, and 8*I respectively. To produce an output current of 15*I, all switches 605, 610, 615, and 620 would be closed. To produce an output current of 12*I, switches 605 and 610 would be open and switches 615 and 620 would be closed. To produce 8*I, only switch 620 would be closed. To produce 4*I, only switch 615 would be closed, 2*I would require switch 610 to be closed while I would require switch 605 to be closed.

Figure 7:
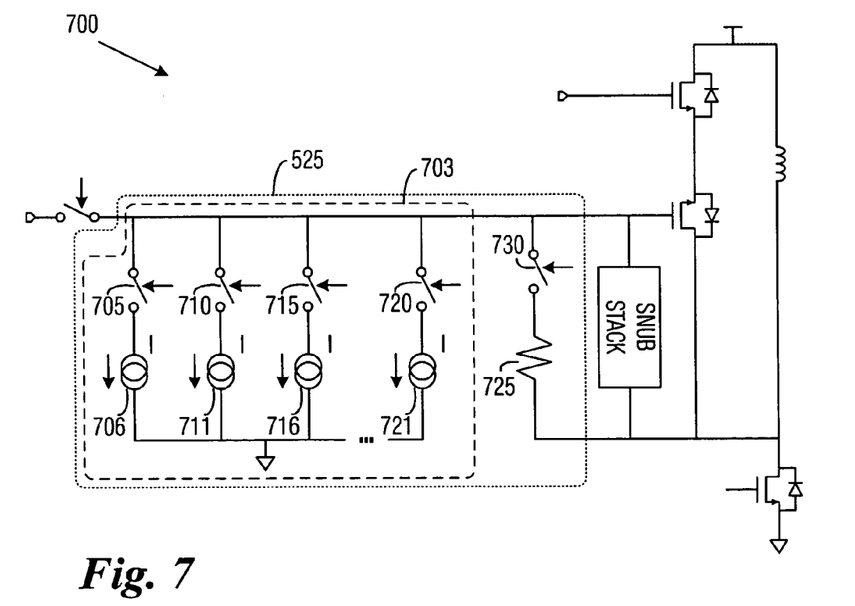
FIG. 7 is a diagram of a circuit for controlling current across an inductive load with a detailed view of the voltage varying circuit, according to a preferred embodiment of the present invention.

With reference now to FIG. 7, there is shown a diagram illustrating a circuit 700 for controlling current across an inductive load with a detailed view of the current varying circuit with a detailed view of a voltage varying circuit 525, according to a preferred embodiment of the present invention. The voltage varying circuit 525 shown in FIG. 7 illustrates a linear arrangement for current sources 706, 711, 716, and 721, wherein each of the current sources 706, 711, 716, and 721 each produce the same amount of current. The remainder of the circuit 700 may be similar to the circuit 600 (FIG. 6).

Figure 8:
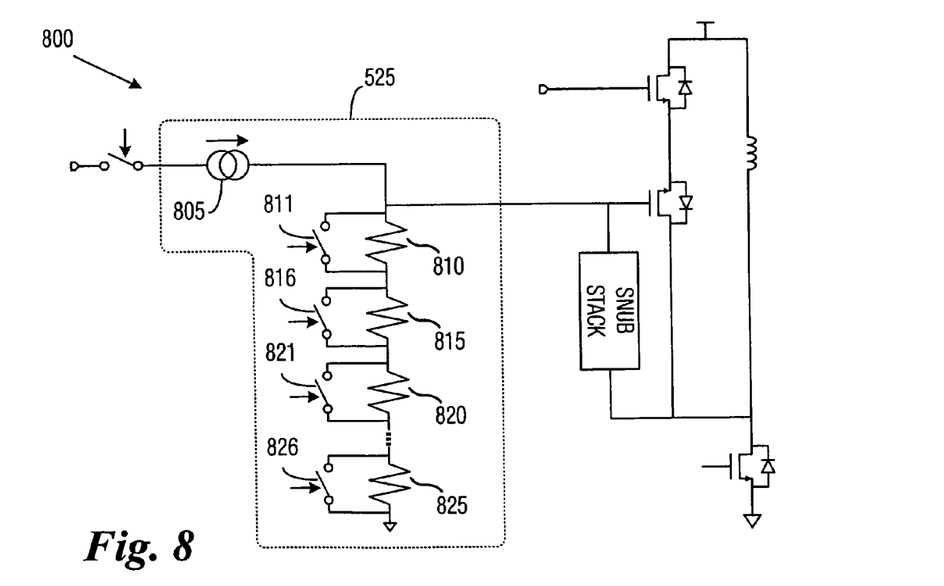
FIG. 8 is a diagram of a circuit for controlling current across an inductive load with a detailed view of the voltage varying circuit, according to a preferred embodiment of the present invention.

With reference now to FIG. 8, there is shown a diagram illustrating a circuit 800 for controlling current across an inductive load with a detailed view of the voltage varying circuit, according to a preferred embodiment of the present invention. Note that in FIGS. 6 and 7, there are shown detailed views of the voltage varying circuit 525 (FIG. 5a) that makes use of a variable current source to generate the varying voltage levels. In FIG. 8, the voltage varying circuit 525 can be made from a series of resistors coupled in series. As shown in FIG. 8, a series of resistors 810, 815, 820, and 825 can be coupled together in series. The resistors 810, 815, 820, and 825 can have essentially equal resistances or they may be scaled (similar to the current sources displayed in FIGS. 6 and 7). Coupled in parallel to the resistors 810, 815, 820, and 825 can be switches 811, 816, 821, and 826 (for example, switch 811 may be coupled in parallel to resistor 810). A current source 805 coupled to the resistors 810, 815, 820, and 825 can produce a desired voltage drop at the output of the voltage varying circuit 525. The switches 811, 816, 821, and 826 may be controlled by logic (not shown) that can open and close, changing the resistance seen by the current source 805.

Figure 9A:
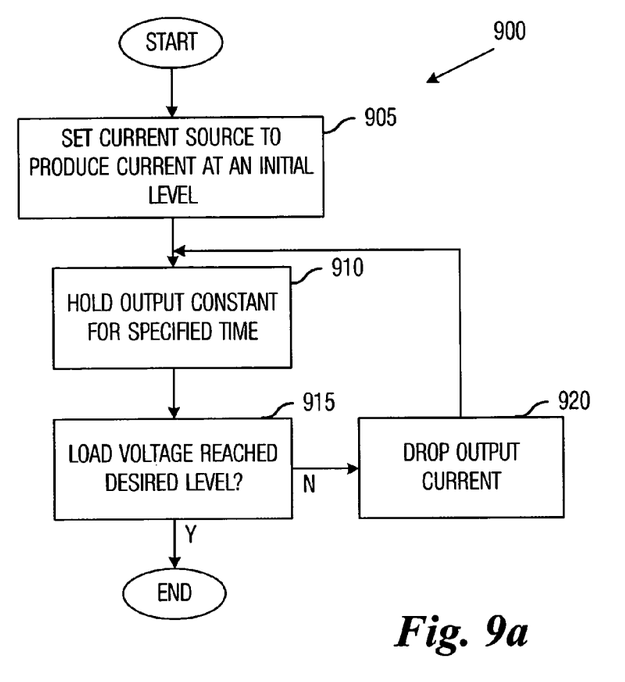
FIGS. 9a and 9b are diagrams of algorithms for adjusting output current for a current varying circuit, according to a preferred embodiment of the present invention.

With reference now to FIG. 9a, there is shown a diagram illustrating an algorithm 900 for adjusting output current for a current varying circuit (such as the current varying circuit 525 (FIG. 5a)), according to a preferred embodiment of the present invention. The algorithm 900 may execute in a logic block (not shown) that can be used to control switches (such as switches 605, 610, and so forth (FIG. 6)) that complete a current path from current sources (such as current sources 606, 611, and so forth (FIG. 6)) to the RSNUB resistor 529 and switch 531 (both of FIG. 5a). The logic block can generate signals to control the state of the switches (either open or closed) to control the magnitude of the output current for the current varying circuit 525.

Initially, the logic block can set the state of the switches so that the current varying circuit 525 produces an initial current (block 905), which according to a preferred embodiment of the present invention, may be the maximum amount of current that can be produced by the current varying circuit 525. Alternatively, the initial current may be close to the maximum amount of current that the current varying circuit 525 can produce. After setting the current varying circuit 525 to produce an initial current, the logic block can have the current varying circuit 525 hold the current for a period of time (block 910). After the time expires, the logic block may check to see if the load voltage (the voltage across the inductive load 535 (FIG. 5a)) has reached a desired level (block 915). When the load voltage reaches a desired level, the logic block knows that the current across the inductive load 535 has also reached the desired level. If the load voltage has not dropped to the desired level, then the logic block can set the current varying circuit 525 to produce a lower current (block 920) and to hold the current for a specified amount of time (block 910). The logic block may continue to check the magnitude of the load voltage (block 915) and until the load voltage reaches the desired level, the logic block can continue to drop the output current. Once the load voltage reaches the desired level, the algorithm 900 is complete.

Figure 9B:
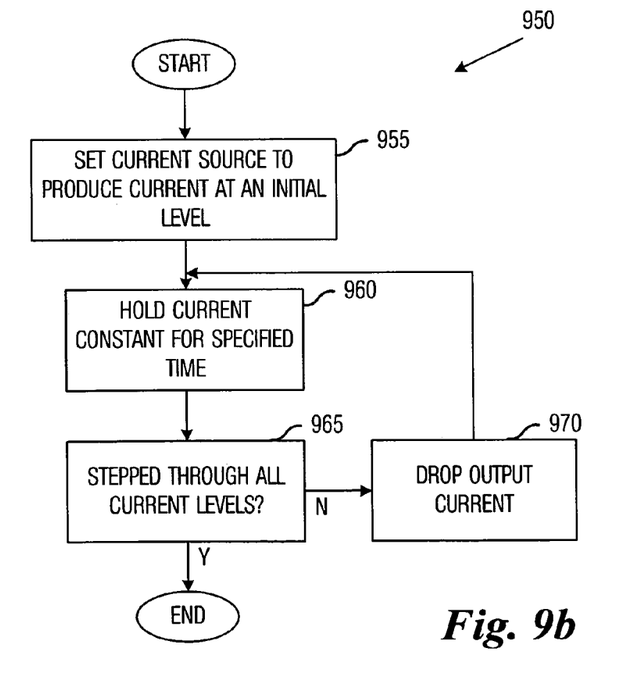

With reference now to FIG. 9b, there is shown a diagram illustrating an algorithm 950 for adjusting output current for a current varying circuit (such as the current varying circuit 525 (FIG. 5a)), according to a preferred embodiment of the present invention. The algorithm 900 described above (FIG. 9a) uses a terminating condition to determine when the current across the inductive load 535 has reached a desired level. The use of a terminating condition may result in an unpredictable amount of time required to remove the current from the inductive load 535. Rather than checking for a terminating condition, the algorithm 950 may have a specified sequence of currents that the current varying circuit 525 should produce and for each output current, there may be a specified amount of time that the current varying circuit 525 should hold the current.

As described above, a logic block (not shown) can be used to execute the algorithm 950. The logic block can set the states of the switches in the current varying circuit 525, and may initially set the current varying circuit 525 to produce an initial current (block 955) and have it maintain the current for a specified amount of time (block 960). After the specified amount of time expires, the logic block can simply check to see if it has cycled through the sequence of output currents (block 965) and if it has not, it can set the switches in the current varying circuit 525 to produce an output current that is next in the sequence (block 970). The logic block can continue to cycle through the sequence until it has completed the sequence of currents.

Note that the sequence of currents may not need to decrease with an equal step size. For example, referring back to FIG. 4a, the first few steps in the sequence may be larger in magnitude than subsequent steps in the sequence. Additionally, the time that each step in the sequence of currents can differ for each step. For example, referring back to FIG. 4c, the initial steps in the sequence of current may be held for a longer amount of time than the subsequent steps. However, it may be possible that each step in the sequence of currents be equal in size and that each step be held for a period of time that is equal for all steps in the sequence.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for controlling a clamping voltage across a terminal of a transistor comprising:
   providing a first clamping voltage in a conductive loop that includes the terminal of the transistor for a first specified period of time;
   reducing the first clamping voltage to an intermediate clamping voltage;
   holding the intermediate clamping voltage for a specified period of time; and
   repeating the reducing and the holding until the intermediate clamping voltage is essentially equal to a final clamping voltage wherein intervals between clamping voltage levels are equal.

2. The method of claim 1, wherein the first specified period of time and the specified period of time are equal.

3. The method of claim 1, wherein intervals between clamping voltage levels are different.

4. The method of claim 1, wherein the terminal is a gate of the transistor.

5. The method of claim 1, wherein the terminal is a drain of the transistor.

6. The method of claim 1, wherein the transistor is a field effect transistor.

7. A method for rapidly removing a current from an inductive load without current undershoot comprising:
   setting a variable current source to produce a first current;
   holding the variable current source output for a first period of time;
   checking if a terminating condition is met;
   setting the variable current source to produce a second current for a second period of time, wherein the second current is smaller than the first current, if the terminating condition is not met; and
   repeating the checking and the setting.

8. The method of claim 7, wherein the terminating condition checks to see if a voltage across the inductive load has reached a specified threshold.

9. The method of claim 7, wherein the terminating condition checks to see if the variable current source has produced all of the currents in a specified sequence of currents.

10. The method of claim 7, wherein a change between consecutive pairs of currents is the same.

11. The method of claim 7, wherein a change between consecutive pairs of currents can differ, and wherein a change between consecutive pairs of currents decreases each time the variable current source produces a different current.

12. The method of claim 7, wherein each current is produced for a specified period of time, and wherein all specified periods of time are equal.

13. A circuit comprising:
   a driver circuit coupled to an inductive load, the driver circuit containing circuitry to control a current built up across the inductive load; and
   a voltage varying circuit coupled to the driver circuit, the voltage varying circuit containing circuitry to produce a sequence of voltages wherein the voltage varying circuit comprises:
   a variable current source to produce an output current of variable magnitude depending upon an input signal; and
   a snub resistor coupled in parallel to the variable current source.

14. The circuit of claim 13, wherein the sequence of voltages is a decreasing sequence of voltage levels.

15. The circuit of claim 13, wherein the snub resistor is coupled to the variable current source via a switch.

16. The circuit of claim 13, wherein the variable current source comprises:
   a plurality of current sources, each current source capable of producing a current at a fixed magnitude; and
   a plurality of switches, each switch serially coupled to the one current source from the plurality of current sources.

17. The circuit of claim 16, wherein the input signal can be used to control the state of each switch from the plurality of switches.

18. The circuit of claim 16, wherein the variable current source produces an output current equal to the sum of the individual current sources which have their switches closed.

19. The circuit of claim 16, wherein the currents produced by the current sources are equal.

20. The circuit of claim 16, wherein the currents produced by the current sources are different, and wherein the currents increase in an exponential fashion.

21. The circuit of claim 20, wherein the base of the exponential growth is two (2).

22. The circuit of claim 13, wherein the snub resistor is coupled to the variable current source with a switch, and wherein when the switch is closed, a voltage drop equal to the output current of the variable current source times the resistance of the snub resistor is produced across the snub resistor.

23. The circuit of claim 13, wherein the snub resistor comprises:
   a serial chain of resistors coupled in parallel to the variable current source, each resistor is coupled in parallel to a switch, wherein each switch is controlled by a control signal, and wherein an effective resistance of a resistor and switch combination is equal to the resistance of the resistor when the switch is open and is equal to zero when the switch is closed.

24. The circuit of claim 23, wherein each resistor in the serial chain has essentially equal resistance.

25. The circuit of claim 13, wherein the driver circuit comprises:
   a first high side drive circuit coupled to a supply voltage source, the first high side drive circuit to permit current from the inductive load to dissipate into the supply voltage source;
   a second high side drive circuit coupled to the first high side drive circuit and the current varying circuit, the second high side drive circuit to allow a voltage drop generated by the current varying circuit to appear in the driver circuit; and
   a low side drive circuit coupled to the current varying circuit and the inductive load, the low side drive circuit to regulate the current build up across the inductive load.

26. The circuit of claim 25, wherein each drive circuit comprises a metal oxide semiconductor field effect transistor (MOSFET) coupled in parallel with a body diode.

27. The circuit of claim 26, wherein the source terminals of the field effect transistors in the first and second high side drive circuits are coupled together.

28. The circuit of claim 13, wherein the driver circuit is a low-side driver circuit.

29. The circuit of claim 13, wherein the driver circuit is a full H-bridge circuit.

30. The circuit of claim 13, wherein the driver circuit is a half bridge circuit.

31. The circuit of claim 13, wherein the inductive load is a solenoid mechanism for an automotive brake.

32. The circuit of claim 13 further comprising a snub stack coupled in parallel to the driver circuit and the current varying circuit, the snub stack to produce a fixed voltage drop.

33. The circuit of claim 32, wherein either the current varying circuit or the snub stack can be enabled.

34. The circuit of claim 32, wherein the snub stack can offer electrostatic discharge protection.

* * * * *